United States Patent Office 3,278,481
Patented Oct. 11, 1966

3,278,481
STABILIZATION OF OXYMETHYLENE POLYMERS WITH PHENOLIC AMIDES
Klaus-Dieter Asmus, Edgar Fischer, and Günther Roos, all of Frankfurt am Main, Germany, assignors to Farbwerke Hoechst Aktiengesellschaft vormals Meister Lucius & Brüning, Frankfurt am Main, Germany, a corporation of Germany
No Drawing. Filed Nov. 6, 1962, Ser. No. 235,876
Claims priority, application Germany, Nov. 11, 1961, F 35,351
9 Claims. (Cl. 260—45.8)

The present invention relates to the stabilization of polyacetals or oxymethylene polymers, particularly oxymethylene homopolymers and copolymers of formaldehyde or trioxane, against the action of heat and oxygen.

Polyacetals, as that term is used herein, are homopolymers and copolymers having recurring

units in which R stands for a hydrogen atom or an alkyl group, for example a $CH_3$-group. Especially important are polyacetals of the above general formula in which R represents a hydrogen atom, i.e. polyoxymethylenes.

It is known that high molecular weight polyoxymethylenes which are intended for use in the manufacture of shaped structures such as tubes, profiles or injection molded articles, must be subjected to various stabilizing processes before being worked up.

For example, high molecular weight polyoxymethylenes obtained in known manner, for example by polymerization of formaldehyde, must be protected against a depolymerization by an unzipping reaction liberating formaldehyde, by blocking the terminal groups, for example, by esterification or etherification of the terminal hydroxyl groups.

Copolymers of formaldehyde or trioxane with, for example, diethylene glycol formal (DiFo) or ethylene oxide contain an unstable proportion consisting of the terminal formaldehyde units. Besides the blocking of terminal groups mentioned above for homopolymers, the terminal groups of copolymers can be particularly successfully stabilized by removing such unstable proportions by a thermal treatment of the copolymers. In this case, depolymerization stops at the oxyethyl units. It is furthermore necessary to protect the said polymers against the action of heat or light or oxidation by adding an appropriate stabilizer.

For example, derivatives of hydrazine, urea or thiourea, acid amides, advantageously dicarboxylic acid diamides, have been proposed as suitable stabilizers against the thermal degradation of polyoxymethylenes and oxymethylene copolymers.

To improve the resistance to oxidation, it has been proposed to add certain anti-oxidants, such as phenols, particularly methylene bisphenols, and organic sulfur compounds.

Some of these proposed compounds, however, have only an unsatisfactory stabilizing action. Amides, for example, often tend to exude from the polymer. Polyamides in many cases give rise to discoloration and are, in part, only slightly compatible with the polymer. Moreover, in the case of combinations consisting of a thermostabilizer and an oxidation stabilizer, synergistic effects play an important role so that both stabilizers must be tuned to one another.

Compounds which stabilize polyoxymethylenes against thermal degradation as well as against oxidation have not been known so far.

Now we have found that compounds of the following Formula I (I)  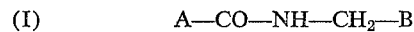

in which A represents a hydroxy phenyl radical linked to the carbonyl group preferably in ortho-position, and B represents an alkylated hydroxy phenyl radical, the hydroxyl group being advantageously in ortho- or para-position to the methylene group, which compounds are designated hereinafter as "amide bisphenols," have an excellent stabilizing action on oxymethylene polymers. As alkyl substitutents B may carry alkyl groups having advantageously 1 to 9 carbon atoms, for example the methyl, ethyl, propyl, isopropyl, butyl, isobutyl, tertiary butyl or nonyl group. The number and position of these alkyl groups has no essential influence on the stabilizing action but the phenols should advantageously by alkylated twice.

The compounds of the above Formula I are colorless, crystalline compounds which are readily soluble in polar solvents.

They are substances which contain an amide grouping and also constitute an unsymmetrical bisphenol. Most decisive, however, is the amide-methylene grouping enclosed between the two different phenols.

It has been found that these amide bisphenols stabilize oxymethylene polymers against thermal degradation and simultaneously against oxidation. The stabilizing action against oxidation of the amide bisphenols to be used in accordance with the invention is at least equal, even without addition of a costabilizer, to that of known bisphenols which, however, necessitate a costabilizer.

The amide bisphenols have the following further advantages:

They are easy to produce, for example by condensation of N-methylol-phenol-carboxylic acid amides with repeatedly alkylated phenols.

They can be easily applied. Whereas the effectiveness of some known stabilizers depends on the manner in which they are added to the polymer, the amide bisphenols can be added according to any desired method known for mixing stabilizers with polymers, without the quality of the product being impaired. Exemplary of such mixing processes are: mixing in the melt in a kneader, mechanical mixing of solid polymer and solid stabilizer, mixing a solution of the amide bisphenols with the solid polyoxymethylene or mixing a solution of the polyoxymethylene with an amide bisphenol or mixing a solution of the amide bisphenol with a solution of the polyoxymethylene and then evaporating the solvent. As suitable solvents for preparing the above mentioned solutions there may be mentioned, for example, acetone, methanol or dimethyl formamide.

The stabilizers according to the invention do not produce discoloration of the polymer, even on heating for a prolonged time, and do not exude.

They are well compatible with polyoxymethylenes.

They can be used for stabilizing homopolymers and advantageously copolymers of formaldehyde or trioxane.

The stabilizing action is still considerably increased by the concomitant use of a small amount of an additional thermo-stabilizer. Exemplary of suitable additional thermo-stabilizers are dicarboxylic acid diamides such as malonic acid diamide or succinic acid diamide, polyamides such as poly-methoxy-methyl-caprolactam or polymers of N-vinylpyrrolidone, aromatic amines, for example diphenylamine, hydrazides such as terephthalic acid hydrazide, urea derivatives such as diphenyl urea or bis-β-naphthyl thiourea, and advantageously dicyan diamide.

It is in general advantageous to subject to the stabilization according to the present invention high molecular weight oxymethylene polymers whose terminal groups have already been stabilized, for example, by acetylation if homopolymers are concerned or by thermal degradation in the case of copolymers, although in principle polymers whose terminal groups have not been stabilized may also be used.

The oxymethylene polymers are generally admixed with 0.01 to 10%, advantageously 0.5 to 2% of amide bisphenol, the percentage figures being calculated on the weight of the polymer to be stabilized. Alternatively, mixtures of different amide bisphenols may be used. In many cases it may be advantageous to use the amide bisphenol or amide bisphenols together with other known heat or light stabilizers.

The following examples serve to illustrate the invention but they are not intended to limit it thereto, the parts and percentages being by weight.

The oxymethylene polymers used in the examples were acetylated homopolymers and copolymers of trioxane and ethylene oxide having a reduced viscosity within the range of 0.5 to 1.5, determined on a 0.5% solution of the polymer in butyrolactone at 140° C., with the addition of 2% diphenyl amine as stabilizer.

To determine the stability of the high molecular weight oxymethylene polymers stabilized with the compounds of the Formula I indicated above and for comparison that of unstabilized samples, the loss in weight (in percent) of a sample heated at 230° C. for 45 minutes under air was measured, the loss in weight per minute being stated.

*Example 1*

50 parts of an acetylated trioxane homopolymer were suspended in a solution of 0.5 part of 2-methyl-4-hydroxy-5-isopropyl-benzyl-salicylamide in 100 parts of acetone and the mixture so obtained was evaporated to dryness while being moved mechanically. When the thermo-stability was determined according to the above method, an unstabilized sample lost 1.031% of its weight, whereas the loss in weight of a stabilized sample under the same conditions amounted to 0.153%.

*Example 2*

5 parts of a copolymer built up from 98% of trioxane and 2% of ethylene oxide were kneaded for 15 minutes at 200° C. with 0.05 part of N-(2-methyl-4-hydroxy-5-isopropylbenzyl)-salicylamide. While the loss in weight of a sample of the stabilized product amounted to 0.053% only, the loss in weight of an unstabilized sample was 0.635%.

*Example 3*

In each case, 5 parts of a copolymer built up from 98% of trioxane and 2% of ethylene oxide were kneaded for 15 minutes at 200° C. with 0.05 part of one of the amide bisphenols indicated in the following Table 1 and 0.01 part of dicyan diamide. The stability values determined in the stabilized samples are compared in Table 1 with the stability value of an unstabilized sample.

TABLE 1

| Stabilizer | Loss in weight in percent |
|---|---|
| None | 0.553 |
| 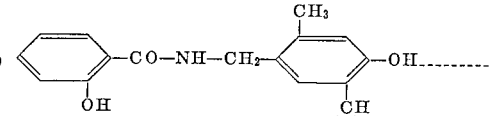 | 0.029 |
| 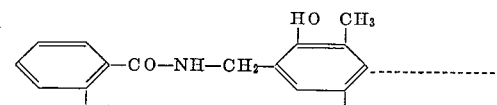 | 0.025 |
| 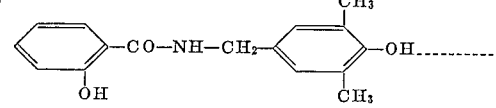 | 0.027 |

*Example 4*

4 parts of a copolymer built up from 98% of trioxane and 2% of ethylene oxide were stabilized, in each case with 0.028 part of one of the amide bisphenols indicated in the following Table II and, in comparison tests, with 0.028 part of the same amide bisphenol plus 0.008 part of dicyan diamide by absorption from a methanolic solution.

The losses in weight per minute obtained in the above thermostability test are indicated in Table II.

TABLE 2

| Stabilizer | Loss in weight in percent |
|---|---|
| None | 0.191 |
| 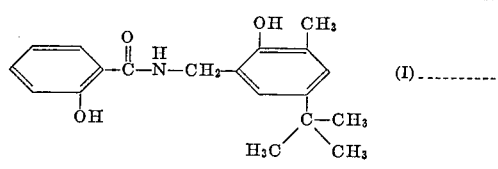 (I) | 0.033 |
| I+dicyan diamide | 0.028 |
| 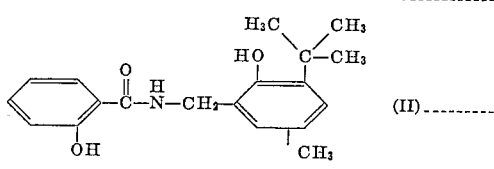 (II) | 0.041 |
| II+dicyan diamide | 0.029 |

We claim:

1. Composition of matter comprising a polyacetal having reccuring

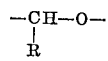

units, in which R represents hydrogen or lower alkyl and 0.01 to 10% by weight, calculated on the polyacetal, of a member selected from the group consisting of malonic acid diamide, succinic acid diamide, polymethoxymethyl caprolactam, N-vinyl-pyrrolidone polymer, diphenylamine, terephthalic acid hydrazide, diphenylurea, bis-β- naphthyl thiourea and dicyandiamide and of a compound of the formula $$A—CO—NH—CH_2—B$$

wherein A represents a hydroxyl phenyl radical and B represents an alkylated hydroxyl phenyl radical.

2. Composition of matter comprising a polyacetal having recurring $$-CH-O-$$
$$\phantom{-CH-}|\phantom{O-}$$
$$\phantom{-CH-O}R$$

units, in which R represents hydrogen or lower alkyl and 0.01 to 10% by weight, calculated on the polyacetal, of dicyan diamide and of a compound of the formula $$A—CO—NH—CH_2—B$$

wherein A represents a hydroxy phenyl radical and B represents an alkylated hydroxyl phenyl radical.

3. A polymer composition comprising a high molecular weight polyacetal having recurring $$-CH-O-$$
$$\phantom{-CH-}|\phantom{O-}$$
$$\phantom{-CH-O}R$$

units in which R is hydrogen or lower alkyl and from about 0.01 to 10% by weight of an amide bisphenol of the formula $$A—CONHCH_2—B$$

wherein A represents hydroxy phenyl and B represents a hydroxy phenyl substituted by alkyl of 1 to 9 carbon atoms.

4. A polymer composition comprising a high molecular weight oxymethylene polymer and from about 0.01 to 10% by weight of an amide bisphenol of the formula $$A—CONHCH_2—B$$

wherein A is o-hydroxy phenyl and B is an ortho or para-hydroxy phenyl substituted by two alkyl groups containing up to nine carbon atoms.

5. A polymer composition comprising a high molecular weight oxymethylene polymer and from about 0.01 to 10% by weight of the compound

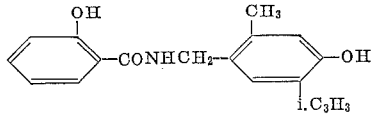

6. A polymer composition comprising a high molecular weight oxymethylene polymer and from about 0.01 to 10% by weight of the compound

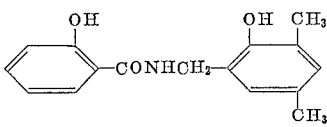

7. A polymer composition comprising a high molecular weight oxymethylene polymer and from about 0.01 to 10% by weight of the compound

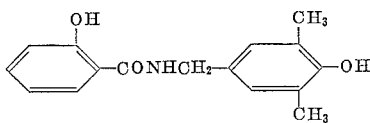

8. A polymer composition comprising a high molecular weight oxymethylene polymer and from about 0.01 to 10% by weight of the compound

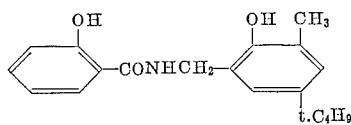

9. A polymer composition comprising a high molecular weight oxymethylene polymer and from about 0.01 to 10% by weight of the compound

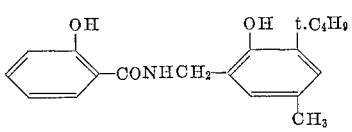

References Cited by the Examiner
UNITED STATES PATENTS

| | | | |
|---|---|---|---|
| 2,966,476 | 12/1960 | Kralovec et al. | 260—45.95 |
| 3,116,267 | 12/1963 | Dolce | 260—45.9 |
| 3,174,937 | 3/1965 | Strobel et al. | 252—300 |

LEON J. BERCOVITZ, *Primary Examiner.*

DONALD E. CZAJA, *Examiner.*

M. J. WELSH, *Assistant Examiner.*